Patented June 4, 1940

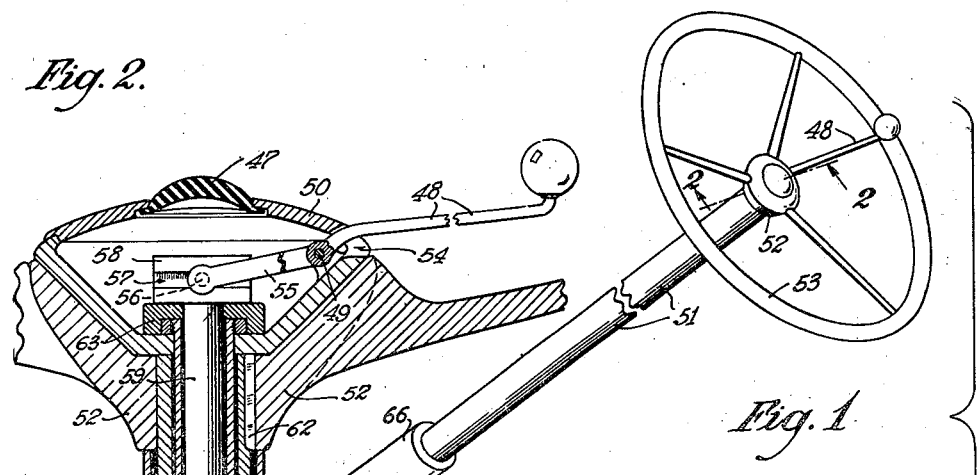
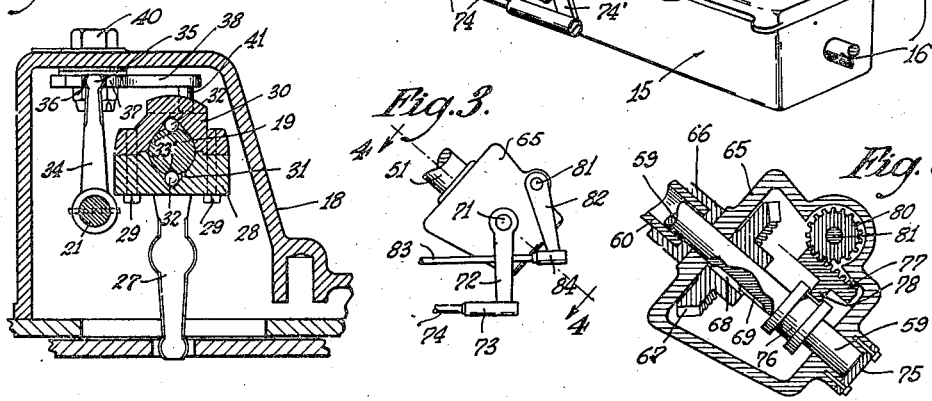
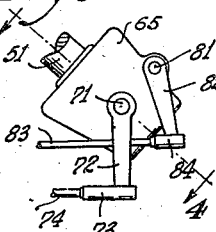
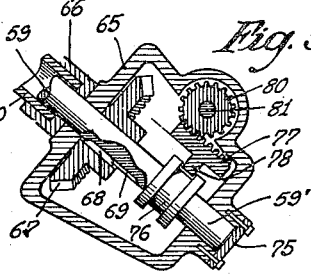
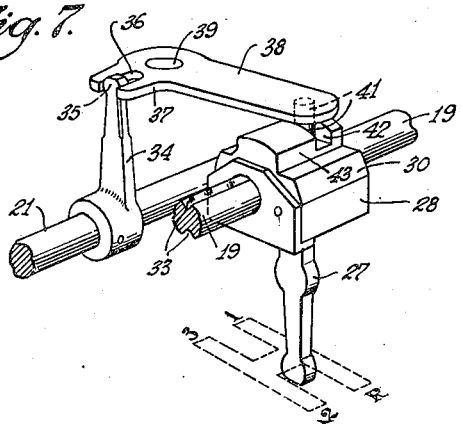
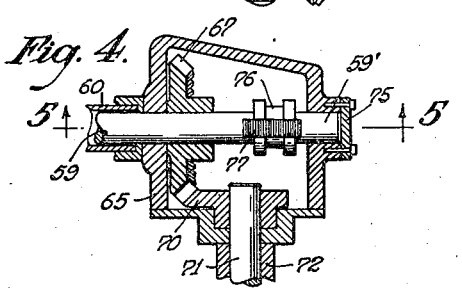

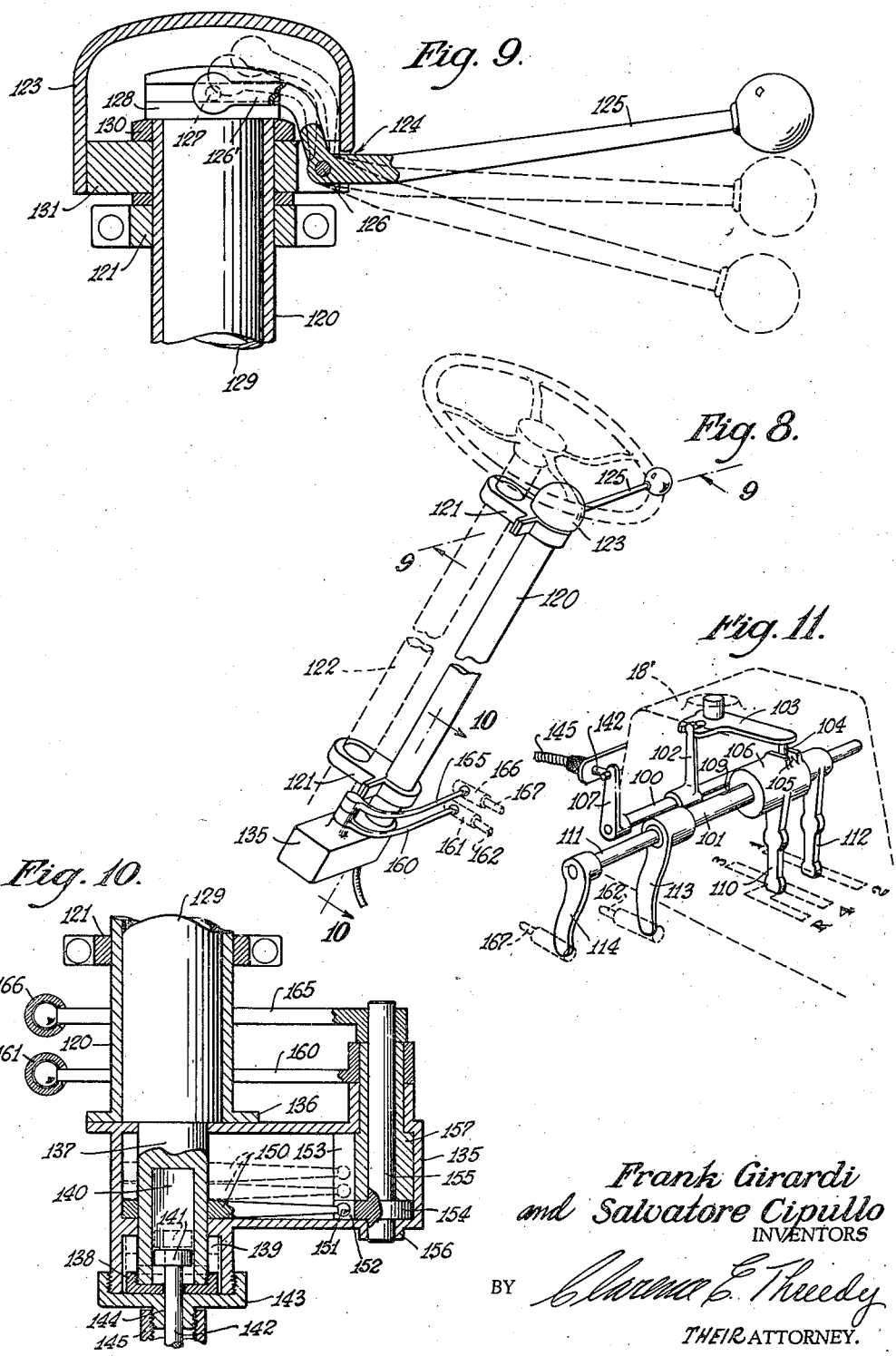

2,202,949

UNITED STATES PATENT OFFICE 2,202,949

GEARSHIFT MECHANISM

Frank Girardi and Salvatore Cipullo, Chicago, Ill., assignors, by direct and mesne assignments, to Robert A. Dublin and Antonio Torretta, both of Chicago, Ill., as trustees Application March 30, 1938, Serial No. 198,941

8 Claims. (Cl. 74—484)

This invention pertains to gear shifting mechanism of general application but especially adapted for use with automotive vehicles, and includes as one of its principal objects the provision of an improved gearshift mechanism for mounting upon or adjacent to the steering wheel to remove the shift rod from obstructing position on the floor.

Another object is the provision of gearshift mechanism of the class characterized, and which is adapted for installation either as part of the original equipment or as replacement equipment for cooperation with standard gearshift mechanism whereby to provide a more accessible and conveniently operated shift means and remove the usual shift rod from the floor of the driver's compartment.

Another object is to provide a gear shifting attachment of the class characterized and which may be employed with either the standard three-speed-forward transmission or the four-speed-forward transmission.

A further object is the provision of gear shifting means for use with standard transmission equipment and adapted for mounting either as a part of the steering post structure or an auxiliary attachment thereto.

A further object is the provision of a simple, rugged and wholly reliable mechanism in the form of an attachment designed to replace the cover structure on a standard transmission gear set housing for cooperation with the speed changing gear system thereof, said mechanism being designed for cooperation with a simple shift lever mechanism arranged upon the steering post for easy access to the driver's hand.

Yet another object is the provision of a gear shifting mechanism of the type above characterized and adapted for cooperation with a standard three-speed-forward gearshift set and including a shifting finger cooperable with the gear set, operating means for the shift finger in the form of a rocker mounted for both rocking an axially shifting or translating movement; improved bearing means for mounting the rocker; and oscillable lever means for shifting the rocker.

Yet another object is the provision of a simple modification of the gear shifting mechanism for cooperation with the four-speed-forward type of gear set and wherein there are provided a pair of shift fingers and means for selectively operating the same.

Still another object is an improved gearshift lever and means for mounting the same either at the top of the steering post itself with a drive shaft disposed within the post, or mounted atop an auxiliary post structure attached to the steering post so as to dispose the lever close to the wheel.

A still further object is the provision of improved means arranged at the bottom of the main steering post or the auxiliary post attachment for effecting driving connection between the shift lever and the shifting mechanism.

Other objects and novel aspects of the invention reside in certain details of construction, as well as the operation and location of certain parts hereinafter to be described in view of the annexed drawings, in which:

Fig. 1 is a perspective view of a three-speed-forward shift mechanism and manual shift lever arranged as part of the steering post structure;

Fig. 2 is an enlarged fragmentary vertical section through the steering wheel hub structure and shift lever means, as seen in the direction of lines 2—2 of Fig. 1;

Fig. 3 is a side elevation of a post connection housing for use with the device of Fig. 1;

Fig. 4 is a slightly enlarged section through a post connection housing structure like that of Fig. 3, as the same would be viewed along lines 4—4 of Fig. 3;

Fig. 5 is a median section through the post connection mechanism, as seen along lines 5—5 of Fig. 4;

Fig. 6 is a fragmentary vertical section, to enlarged scale, of the shift finger rocker shaft assembly, as viewed in the direction of lines 6—6 of Fig. 1;

Fig. 7 is an enlarged perspective of the mechanism shown in Fig. 6;

Fig. 8 shows an auxiliary post attachment for mounting on the regular steering post in four-speed-forward installations;

Fig. 9 is an enlarged fragmentary section through the shift lever mounting atop the auxiliary post attachment, as viewed in the direction of lines 9—9 of Fig. 8;

Fig. 10 is an enlarged vertical section through the lower operating connection or linkage housing for the device of Fig. 8, as seen in the direction of lines 10—10 of the latter; while Fig. 11 is a perspective view of the four-speed-forward shift operating mechanism, Figs. 8, 9 and 11 being complementary and arranged substantially in the position assumed by their respective elements in cooperative relation.

The present invention relates to improvements in the general class of shift operating means disclosed in United States Patent 1,992,419 to Frank Girardi, one of the inventors herein, and in accomplishing the several objects heretofore recited, there is provided, in a preferred embodiment of the three-speed-forward arrangement in Fig. 1, a standard set of transmission speed shifting gears arranged for three-speed-forward operation in a casing 15 arranged on the car chassis for cooperation with the driving or torque shaft 16 in the well-known manner. Those skilled in the art will recognize that the customary upright shift rod is missing from the top cover structure of this gear set, it being one of the objects of the invention to dispense with this element entirely.

Replacing the usual cover plate of the gear set housing 15 is a base plate 17 having a small integrally cast dome or chamber 18 housing the improved shifting mechanism of the present invention, said mechanism including a laterally extending rocker shaft 19 seated for rocking or oscillatory movement in suitable bearings provided in the casting, one of which is provided by the boss formation 20. Extending collaterally with the rocker shaft 19 is a rocker shaft 21 (see Figs. 6 and 7 also), which, like the rocker shaft 19, projects laterally from the housing portion 18 for connection with a linkage or operating means hereinafter to be described.

Means for actuating or shifting the transmission gear set, includes a depending shift finger 27 (Figs. 6 and 7) suitably shaped at its lower end portion particularly for cooperation with standard equipment gear sets, this finger being attached at its upper end to the lower half section 28 of the rocker block, the lower section being removably attached, as by bolts 29, to an upper half section 30.

Both half sections of the rocker block are provided with complementary and substantially V-shaped grooves 31 adapted to fit around or embrace the rocker shaft 19 when the halves of the block are clamped together, the apex or bottom portion of each of the grooves 31 providing a bearing seat for roller bearing members 32, there being a plurality of these bearings serially aligned in axially extending groove portions 33 in the shaft 19. Thus, the rocker block is keyed to the shaft 19 for rocking or oscillatory movement with the latter, and at the same time the block is free for translatory or axially sliding movement on the shaft 19. It will thus be apparent that the shift finger 27 is capable of movement to follow a standard shift pattern indicated in dotted lines in Fig. 7.

Means for shifting or reciprocating the shift finger 27, and hence the block structure 28—30 to which it is attached, includes an oscillable arm 34 secured to the shaft 21 adjacent the shaft 19 and having an upper end portion 35 disposed in a slot or yoke 36 formed in a short offset arm 37 of a shift crank 38 pivotally mounted as at 39 upon the under top surface of the top chamber 18 by means such as the bolt 40 (Figs. 1 and 6 also).

Depending from the free end portion of the crank arm 38 is a stud 41 disposed in a groove 42 cut in a top boss portion 43 of the upper rocker block section 30. It will be apparent that when the shaft 21 is oscillated by any means, a similar motion will be transmitted to the crank lever 38, which in turn will shift the rocker block in opposite directions on its shaft 19 by virtue of the engagement of the stud 41 in the groove 42 thereof. Thus, the lower end of the shift finger 27 may be moved back and forth in a linear sense between opposite sides of the shift pattern for subsequent oscillatory movement into the various speed positions there indicated (Fig. 7).

Means for operating the shift mechanism includes a shift lever 48 (Figs. 1 and 2) pivotally mounted as at 49 on pin means extending between opposite sides of a top or head chamber 50 surmounting the upper end of a steering post structure 51 and seated concentrically in the hub portion 52 of the steering wheel 53. There is a side opening 54 in the top of the housing or crown 50 adequately dimensioned to permit pivotal movement of the shift lever 48 in an up-and-down direction about the pin mounting 49 as an axis.

The shift lever 48 is also arranged for pivotal movement laterally to-and-fro in a plane at right angles to the axis of the column by means of a rearward yoke formation or extension 55, from the free end portions of which stud pin means 56 project into a circumferential groove 57 in an enlarged head piece 58 at the upper end of a shift operating rod 59 disposed within a protective sleeve 60 which in turn is arranged concentrically in a torque tube 61. The shift rod 59 and surrounding tubular members including the torque tube 61 are all disposed within the steering post tube 51, the torque tube 61 being provided with a key 62 interconnecting the same with the hub portion 52 of the steering wheel for rotative movement with the latter. The torque tube has the usual connections in its lower region with steering tie rods.

It will be evident from the foregoing description that the shift lever 48 is operable for pivotal movement about two axes disposed substantially at right angles to each other, the one being extended through the pin means 49, and the other the axis of the shift rod 59. Thus, when the lever 48 is depressed, it will turn about the pin 49 to raise the shift rod 59, and simultaneously or subsequently the lever may be drawn toward or away from the driver to oscillate the shift rod 59; in the latter movement, the crown or housing 50 oscillates in the hub portion 52 of the steering wheel, the same being mounted in condition for such movement by means of a collar 63 threaded onto the upper end of the shield or protective tube 60 around the upper end of the shifting rod or shaft 59, beneath the enlarged head portion 58 thereof, the lower end of the shield tube 60 being secured in the sleeve portion 66 on the link gear housing 65 (Fig. 5). By means of this construction, the entire steering post control assembly may be readily installed and dismantled, the housing or crown portion 50 turning with the lever 48 when the latter pivots coaxially of the post or column. It may be remarked at this juncture that the shift lever housing or crown 50 may be arranged to include the usual horn button 47 and connections therefor.

Linking the shift operating mechanism with the manual shift lever 48 is a special link gearing means arranged in a housing 65 (Fig. 5) at the lower end of the steering post 51, the latter housing forming part of a sleeve structure 66 having a mounting bracket 66' and embracing the lower end region of the steering post 51, there being the customary driving connection between the torque tube 61 and a steering tie rod, all arranged within the sleeve portion 66.

Arranged within the housing 65 is a bevel gear or pinion 67 slidably keyed to the shift rod 59 by key means 68 slidable in a keyway 69 in the shaft. Meshing with the bevel gear 67 is a driven bevel gear 70 on the inner end of a stud shaft 71 projecting from a side of the housing 65 for connection with a crank arm 72, the latter in turn being connected through a suitable means, such as the ball and socket joint 73, with a link rod 74 (Figs. 3 and 4). By this arrangement, a turning of the shift rod 59 by the shift lever 48 will effect corresponding movement of the lever 72 and a reciprocation of the link rod 74.

The lower end 59' of the shift rod is seated in a removable thrust bearing 75 at the bottom of the housing, and between this lower end and the bevel gear 67 there is a grooved collar 76 rigid with the shaft 59. Slidably mounted for reciprocable movement in a direction parallel with the shaft 59 in the housing 65 is a rack 77 having a finger 78 projecting in the grooved portion of the collar 76, the rack having sliding support in opposite groove formations on the inner surfaces of the housing and being adapted to slide up and down when the shaft 59 is raised and lowered as a result of pivotal movement of the shift lever 48 in an up-and-down direction. A gear 80, mounted upon a stud shaft 81 projecting exteriorly of the housing, meshes with the rack 77 and is driven by the latter to rock the shaft 81 and a crank arm 82 rigid therewith to effect reciprocation of a second link rod 83 connected thereto by a ball and socket connection 84.

The opposite ends of the link rods 74—83 are connected respectively through ball and socket joint means with levers 74' and 83' on the exteriorly projecting portions of the shift mechanism shafts 19 and 21 (Fig. 1), reciprocation of the link rod 83 being effective to shift the rocker block 28—30 and the shift finger 27 back and forth in the manner heretofore explained, the reciprocation of the companion link rod 74 being effective to effect corresponding movement of the rocker block 28—30 and oscillation of the shift finger 27 for selective operation of the transmission gear set.

In the operation of the three-speed-forward arrangement described in view of Figs. 1 through 7, the neutral position of the shift lever and shifting mechanism is shown particularly in Figs. 2 and 7. In order to shift from neutral to first, the operator grasps the shift lever 48 (assuming the clutch to be released, of course) and draws the same toward him so as to turn the shift rod 59 (through the yoke connection 55—56—57) in a clockwise direction (Fig. 2), which would effect an anticlockwise turning of the shaft 71 (Fig. 4), and hence a shifting of the link rod 74 toward the left in Fig. 1 to rock the shaft 19 in a clockwise direction (Fig. 7) and hence urge the finger 27 into first speed. In order to go into reverse from neutral, the shift lever 48 will be pushed away from the driver, the sequence of operations being the reverse of that just described.

In order to shift from first to second, the shift lever 48 may be moved into what would correspond to neutral position and continue the movement of the shift lever from neutral position downwardly and away from the driver, the downward movement effecting a raising of the shift rod 59 and a clockwise movement of the gear 80 (Fig. 5) through the rack and pinion drive, with a consequent shifting of the link rod 83 toward the right as seen in Fig. 1. This latter movement is transmitted through the bell crank lever 38 (Fig. 7) and the depending stud 41 to the finger block 28—30 so that the latter is shifted on its ball bearing keyway toward the left (Fig. 7), it being recalled that the operator at substantially the same time has pushed the shift lever 48 away from him so as to effect a counterclockwise rotation of the rocker shaft 19 to move the shift finger 27 into second-speed position, as indicated in the shift pattern. Shifting from second to third or high is effected by simply drawing the shift lever 48 straight back from its advanced second-speed position toward the driver.

The invention provides a gear shifting means which is adaptable for use with either a three or four-speed forward transmission, and in Figs. 9 through 11, we have illustrated one adaptation to a four-speed-forward transmission and have chosen to illustrate a feature of the invention which provides for the employment of an auxiliary attachment to the steering post.

The gear shifting mechanism is housed in a transmission box cover plate structure or casting, similar to the casting 17—18 described in view of Fig. 1. Moreover, there are arranged within the dome portion 18' of the cover plate casting a pair of collaterally extended shafts 100 and 101 corresponding in a broad sense to the shafts 19 and 21 of the three-speed-forward arrangement, the shaft 100 having a lever 102 drivingly engaged with a bell crank 103 pivoted in the dome and having a depending stud 104 engaged in a lateral slot formation 105 in a shift block or sleeve 106. By this arrangement, rocking of the shaft 100 by its lever 107 will effect translatory or axially shifting movement of the sleeve 106 substantially in the same manner as the translatory or reciprocable shifting of the finger block 28—30 was effected in the device of Fig. 7. Also, the shifting sleeve 106 is preferably provided with keying means slidable in a keyway 109 on the shaft 101, so that the sleeve slides in the latter shaft when properly urged by the bell crank 103. Depending from the shift sleeve 106 is a shift finger 110 cooperable with the third and fourth speed gear of the transmission set.

The shaft 101 has a bore through which projects a first rocker shaft 111 having rigidly arranged therewith a shift finger 112 cooperable with the first and second-speed gear of the transmission set and adapted to be rocked back and forth from the neutral position shown in Fig. 11 to select first and second speeds, the main or outer shaft 101 being similarly rocked to move the shift finger 110 back and forth from the neutral position of Fig. 11 to select third and fourth speeds forward. Reverse drive is effected by pivoting the lever 107 to turn the bell crank 103 in a clockwise direction and shift the sleeve 106 toward the left while the shaft 101 is pivoted in an anticlockwise direction by its operating lever 113 to move the finger 110 back into the reverse selecting position indicated in the shift pattern.

The manual control means for the four-speed-forward shift includes an auxiliary column or post 120 (Fig. 8) secured by brackets or straps 121 to the regular steering post 122, the upper end portion of the auxiliary column terminating preferably just below the steering wheel and being provided with a cap or crown 123 having a side notch or cut-away portion 124 through which projects a shift lever 125 pivotally mounted for movement in an up-and-down direction about an axis provided by pin means 126 secured to the inner portions of the cap or crown 123. The inner end of the shift lever 125 is provided with an offset yoke 126' having pin means 127 in the free end portions of the yoke and extending into the enlarged head part 128 of the upper end of a shift rod or shaft 129 disposed within the column 120.

The upper end portion of the column 120 is provided with a collar 130 disposed between the bottom portion 131 of the cap 123 and the headed portion 128 of the shaft 129, so that the entire cap or crown housing may be oscillated by corresponding movement of the shift lever 125 laterally to-and-fro in the plane normal to the post, oscillation of the shift lever in an up-and-down direction being effective to raise and lower the shift rod or shaft 129 in the column 120.

This operation of the control or shift lever 125 corresponds generally to that of the shift lever 48 described in view of Fig. 2, with the difference, however, that in the four-speed-forward arrangement of Fig. 9, the shift lever has three positions in its up-and-down movement—raised, lowered and intermediate.

Means for linking or operatively connecting the shift lever with the shifting mechanism includes a housing 135 (Figs. 8 and 10) secured by bolt means to flange portions 136 at the lower end of the column or post 120, the reduced end portion 137 of the shift rod 129 extending into the housing 135 for engagement with a cap 138 threaded on the end thereof for movement in a chamber 139 forming part of the housing and effective to limit the reciprocable movement of the shift rod. The lower end portion of the shift rod is provided with a bore 140 into which is slidably fitted the headed end portion 141 of a Bowden wire or cable link 142, the cap 138 preventing withdrawal of the headed portion 141 from the bore. The chamber 139 is preferably of annular shape and is closed off at its lower end by a cap 143 threaded thereon, this cap having a bore through which the Bowden wire 142 extends, the cap having a boss 144 onto which one end of a guide cable 145 is threaded. It may be remarked here that the opposite end of the Bowden wire 142 is connected with the rocker lever 107 on shaft 100 (Fig. 11). Thus, a raising and lowering movement of the shift rod 129 will effect reciprocation of the Bowden wire by virtue of the disposition of the headed portion 141 of the latter in the bore 140 of the shift rod.

Projecting laterally from the lower end portion 137 of the shift rod 129 is a selector finger 150 which oscillates within the housing 135 when the shift rod 129 is turned by the operating lever. The free end portion of the selector finger is tapered and provided with a bearing formation or boss 151 disposed for movement in a pair of aligned grooves 152 and 153 each extended in an axial sense in a pair of telescoped stud shaft members, the groove 152 being formed in a collar portion 154 on a stud shaft 155 seated at its lower end in a boss 156 in the housing. The other groove 153 is formed in a sleeve shaft member 157 embracing the stud shaft 155 and projecting with the latter exteriorly of the housing. Thus, the selecting finger 150 may be moved in an up-and-down direction by raising and lowering movement of the shift rod 129 so as to dispose the bearing portion 151 of the finger into either of the grooves 152 or 153 so that when the shaft 129 is turned, one or the other of the interfitting stud shafts 155 or 157 will be turned.

Secured to the outwardly projecting portion of the stud sleeve 157 is a lever 160 having driving connection through a ball and socket joint 161 and a connecting rod 162 with the rocker lever 113 (see also Fig. 11), while the exposed end portion of the stud shaft 155 engages a lever 165 having connection through a similar ball and socket joint 166 with a connecting rod 167 which in turn is operatively connected with a rocker lever 114 on the inner rock shaft 111.

In operation, the parts are moved from their neutral position shown in Figs. 10 and 11, first speed being selected by movement of the manual shift lever 125 toward the driver so as to effect clockwise movement of the drive shaft 129 and a corresponding movement of the selector finger 150 in its normally lowered position seen in Fig. 10, thus effecting anticlockwise movement of the stud shaft 155 to pivot the link lever arm 165 and draw the corresponding connecting rod 167 toward the left as seen in Fig. 11, thus rocking the shaft 111 in a clockwise direction and projecting the shift finger 112 from its neutral position forwardly (to the left) into first-speed position.

Selection of second driving speed is effected by moving the shift lever 125 away from the driver to effect a reverse operation to that described in the selection of first speed, the shift lever 125, of course, passing back through its neutral position so as to pivot the shift finger 112 toward the right (Fig. 11) and back into second-speed position.

Selection of third speed is effected by pivoting the shift lever 125 into its intermediate position so as to raise the shift rod 129 in the column 120 and thus raise the selector arm 150 so as to transfer its bearing or ball portion 151 from the lower groove 152 in the stud shaft 155 up into the groove 153 of the sleeve shaft 157 and thereby establishing a driving connection with the link operating lever 160 so that a movement of the shift lever away from the driver, effecting anticlockwise movement of the shift rod 129, will pivot the sleeve shaft 157 and its link arm 160 to draw the connecting rod 162 toward the left (Fig. 11) and rock the shaft 101 in a clockwise direction to project the shift finger 110 into third-speed position.

Selection of the fourth-speed forward is effected by manipulation of the shift lever 125 in a reverse manner to that just described in conjunction with the selection of third speed.

In shifting into reverse, the shift lever is depressed to the limit to raise the shift rod 129 to its limit and thus cause the cap portion 138 on the lower reduced end portion 137 of the shift rod to bear against the headed portion 141 of the Bowden wire 142, thus rocking the lever arm 107 (Fig. 11) toward the left and effecting a translatory or axially shifting movement of the rocker sleeve 106 through the agency of the lever 102 and the bell crank 103, whereby to slide the shift finger 110 toward the left, the shift lever thereupon being drawn toward the driver to turn the sleeve shaft 157 in a clockwise direction and urge the rocker lever 113 in an anticlockwise direction, so that the shift finger 110 will be moved to the right, back into reverse position, it being remembered that the selector arm 150 has been raised into driving engagement with the sleeve shaft 157 by the previous depression of the shift lever.

Various modifications may be made in the specific embodiment of the invention set forth in detail herein for purposes of illustration, all without departing from the scope and spirit of the invention as defined by the appended claims, said claims including within their call all equivalent means for effecting the objects of the invention in its broadest aspects.

Having thus described our invention, what we claim as new and desire to protect by Letters Patent is:

1. Gear shifting mechanism for cooperation with a shiftable transmission gear set, said mechanism including a housing, a pair of collaterally mounted rock shafts extending from said housing, and one of the same having a shift finger mounted for axially sliding movement thereon and keyed therewith to be oscillated by rocking movement of the shaft, the other rock shaft having lever mechanism operatively connected with said shift finger so as to effect axially sliding movement of the latter in opposite directions when said other shaft is rocked whereby selective shifting movement of said shift finger may be effected by rocking said shafts in a determined manner, said rock shaft on which the shift finger is mounted having an axial bore with a third rock shaft disposed therein for independent rocking movement therein, there being a second shift finger rigid with said third rock shaft, said shift finger having operative connection with said gear set and being selectively movable as aforesaid to shift the gears of said set.

2. Gear shifting mechanism for use with shiftable transmission gears and including a housing, a pair of parallel rock shafts having pivotal support in said housing, a first one of said rock shafts having a sleeve member keyed thereto for turning movement therewith and also free to slide back and forth in the direction of the axis of said shaft, said sleeve member having a shift finger rigid therewith, lever means mounted in said housing and oscillable to shift said sleeve member back and forth on said first-mentioned shaft, connection between said lever means and said second shaft for actuating said lever means to shift the sleeve member when said second shaft is rocked, a third rock shaft mounted for freely turning movement in said first-mentioned shaft and having a second shifting finger rigid therewith, said housing being mounted with respect to said gear set to dispose said shift fingers in operative engagement with shiftable gear elements of said set.

3. Shifting mechanism for cooperation with a four-speed-forward transmission gear set including a housing, said mechanism including a housing adapted to be mounted upon said gear set housing to constitute a cover for the latter, a pair of collaterally extended rock shafts mounted in said second-mentioned housing and a first one of the same being provided with a rocking element keyed theron so as to be rocked with the shaft and free to slide back and forth axially of the shaft, said rocking element having a shift finger rigid therewith, a bell crank mounted within said second housing and having operative engagement with said rocking element so as to slide the latter back and forth responsive to oscillation of the bell crank, means moved by said second rock shaft for oscillating said bell crank when said shaft is rocked back and forth, a third rock shaft freely mounted within said first-mentioned rock shaft and having a second shift finger rigid therewith, said shift fingers being engageable with shiftable gear means in said gear set and selectively movable by actuation of the several rock shafts in a predetermined manner to effect selective shifting of said gear means.

4. In an automotive gear shifting mechanism, in combination, a hand lever mounted on a steering column for pivotal movement about the axis of the column and also for rocking movement about an axis transverse to the column, shift actuating mechanism comprising a pair of parallel rocking shafts mounted to extend in a horizontal direction transversely of the steering column, a pair of reciprocable connecting members, crank means operatively connecting each of the same with one of said rocking shafts for rocking movement of the latter by reciprocation of the corresponding connecting member, translating mechanism operatively connecting said connecting members with said hand lever so that rocking movement of the latter will effect rocking movement of one of said rocking shafts while pivotal movement of the hand lever will effect rocking movement of the other rocking shaft, a shift operating element mounted for sliding movement on one of said rocking shafts and also arranged to rock with said shaft, a radial finger rigid with the other rocking shaft, and a lever mounted to rock about an axis transverse to the axes of said rocking shafts and having a slotted formation operatively engaged near one end with said finger, the opposite end of said lever having pin and slot engagement with said shift operating element whereby said element may be rocked by its corresponding rocking shaft independently of said last-mentioned lever, said lever being oscillated by the remaining rocking shaft to effect sliding movement of the shift operating element.

5. In a gear shifting mechanism for automobiles, a hand lever mounted on the steering post for rocking movement about an axis transversely of the post and also about an axis extending in the direction of the length of the post, a pair of parallel rocking shafts extending from the transmission housing, each mounted for movement about an axis transversely of said post, gear shifting members reciprocable in parallelism transversely of said rocking shafts and arranged to selectively shift transmission gears, connecting rods extending in parallelism from said rocking shafts toward said post, mechanism operatively linking each of the same with said hand lever for selective reciprocation by movements of said lever in a predetermined manner relative to the aforesaid rocking axis thereof whereby to rock the corresponding rocking shaft, selective coupling means mounted on a particular one of said rocking shafts for movement back and forth selectively into and out of operative engagement with one or the other of said gear shifting members to couple the same with said particular rocking shaft, and lever means actuated by the other rocking shaft and operatively associated with said coupling means for moving the latter back and forth for the purpose aforesaid.

6. In an automotive vehicle including a steering post and a transmission gear set having gear shifting members mounted for shifting operation in parallelism in a direction generally toward said steering post, shifting mechanism including a pair of rocking shafts mounted for movement about parallel axes extending transversely of said shifting members, coupling means mounted on a particular one of said rocking shafts for movement back and forth selectively into and out of operative engagement with one of said gear shifting members to couple the same with said particular rocking shaft for reciprocation responsive to rocking movement of the latter, lever mechanism oscillated by the other rocking shaft to effect back and forth movement of said coupling means, a hand lever means for mounting said hand lever for rocking movement about an axis transversely of said post and also about an axis extending in the direction of the length of said post, and means operatively connecting said hand lever with said rocking shafts whereby the latter may be selectively rocked responsive to manipulation of the hand lever in various predetermined manners relative to the aforesaid rocking axes thereof.

7. In a tranmission gear shifting apparatus for control by a hand lever disposed adjacent the steering post of an automotive vehicle, the combination, with a pair of shifting members arranged for shifting operation in parallelism, of actuating mechanism comprising a pair of parallel rocking shafts, each mounted for movement about an axis transverse to the direction of movement of said shifting members, means operatively linking said rocking shafts with said hand lever for selective actuation by the latter, a coupling member mounted for back and forth movement on a particular one of said rocking shafts for selective movement with one or the other of said shifting members, said coupling member being arranged to rock with said particular rocking shaft to reciprocate the coupled shifting member and actuate said transmission gear set, and means operatively connecting said coupling member with the other rocking shaft and including a radial finger rigid on said other shaft and a lever mounted for pivotal movement by said finger about an axis transverse to said other shaft and at one side of said particular shaft and having pin and slot connection with said coupling member to move the latter back and forth responsive to rocking movement of said other shaft.

8. In a gear shifting mechanism for automobiles, a hand lever mounted on the steering post for rocking movement about an axis transversely of the post and also about an axis extending in the direction of the length of the post, a pair of parallel shafts extending across the transmission housing, each mounted for movement upon an axis transversely of said post, at least one of said shafts being rockable about its respective axis, gear shifting members reciprocable in parallelism transversely of said shafts and arranged to selectively shift transmission gears, connecting devices extending from said shafts toward said post, mechanism operatively linking each of the same with said hand lever for selective reciprocation by movements of said lever in a predetermined manner relative to the aforesaid axis thereof whereby to move the corresponding shaft, a selective coupling slider reciprocably mounted on a particular one of said shafts and carrying a shift finger with its opposite sides selectively movable to-and-fro into and out of operative engagement with one or the other of said gear shifting members to couple the same with each particular shaft, and means actuated by the other shaft and operatively associated with said coupling slider for moving the latter back and forth for the purpose aforesaid.

FRANK GIRARDI.
SALVATORE CIPULLO.